(12) United States Patent
Yan

(10) Patent No.: US 11,356,379 B1
(45) Date of Patent: Jun. 7, 2022

(54) CHANNELIZED RATE ADAPTATION

(71) Applicant: Xilinx, Inc., San Jose, CA (US)

(72) Inventor: Junjie Yan, Stittsville (CA)

(73) Assignee: XILINX, INC., San Jose, CA (US)

( * ) Notice: Subject to any disclaimer, the term of this patent is extended or adjusted under 35 U.S.C. 154(b) by 285 days.

(21) Appl. No.: 16/148,767

(22) Filed: Oct. 1, 2018

(51) Int. Cl.
*H04L 47/625* (2022.01)
*H04L 47/25* (2022.01)
*H04L 49/901* (2022.01)

(52) U.S. Cl.
CPC ........... *H04L 47/626* (2013.01); *H04L 47/25* (2013.01); *H04L 49/901* (2013.01)

(58) Field of Classification Search
None
See application file for complete search history.

(56) References Cited

U.S. PATENT DOCUMENTS

| | | | | |
|---|---|---|---|---|
| 3,872,444 | A * | 3/1975 | Cleveland | G06F 3/1423 710/1 |
| 4,716,562 | A * | 12/1987 | Carse | H04M 11/068 370/294 |
| 5,471,626 | A * | 11/1995 | Carnevale | G06F 9/3867 712/219 |
| 6,272,153 | B1 * | 8/2001 | Huang | G11B 20/10527 370/304 |
| 7,272,320 | B2 * | 9/2007 | DeCusatis | G06F 13/387 398/75 |
| 2005/0058126 | A1 * | 3/2005 | Zettwoch | H04L 12/433 370/375 |
| 2008/0204285 | A1 * | 8/2008 | Carter | H04N 19/89 341/67 |
| 2010/0262893 | A1 * | 10/2010 | Carter | H04N 19/89 714/777 |
| 2012/0008773 | A1 * | 1/2012 | Westerveld | H04N 7/1675 380/220 |
| 2014/0143470 | A1 * | 5/2014 | Dobbs | G06F 9/546 710/308 |
| 2017/0060789 | A1 * | 3/2017 | Noda | G11C 7/1057 |
| 2017/0366337 | A1 * | 12/2017 | Huang | H04L 1/0061 |

* cited by examiner

*Primary Examiner* — Edan Orgad
*Assistant Examiner* — Emmanuel K Maglo
(74) *Attorney, Agent, or Firm* — Patterson + Sheridan, LLP

(57) ABSTRACT

Apparatus and method relating generally to a channelized communication system is disclosed. In such a method, a read signal and a switch control signal are generated by a controller. Received by channelized buffers are data words from multiple channels associated with groups of information and the read signal. The data words are read out from the channelized buffers responsive to the read signal. A switch receives the data words from the channelized buffers responsive to the read signal. A gap is inserted between the groups of information by the switch. One or more control words are selectively inserted in the gap by the switch responsive to the switch control signal. The switch control signal has indexes for selection of the data words and the control words.

20 Claims, 11 Drawing Sheets

| Read Signal State 955 | Scheduler FIFO State 951 | Current Location State 952 | Previous Output State 953 |
|---|---|---|---|
| 0 | Empty | X | X |
| 1 | Not Empty | 1 | 1 |
| 0 | Not Empty | 0 | 1 |
| 1 | Not Empty | X | 0 |

US 11,356,379 B1

CHANNELIZED RATE ADAPTATION

TECHNICAL FIELD

The following description relates to integrated circuit devices ("ICs"). More particularly, the following description relates to channelized rate adaptation for an IC.

BACKGROUND

In some networks, such as for example an Ethernet, a client, such as for example a MAC (medium access control sublayer), operates at a fixed data rate, which may be selected from various fixed data rates. Generally, a MAC provides data flow control and multiplexing of channels for a transmission physical medium. However, a PMD (physical medium dependent sublayer), which may act as a transceiver for a physical medium, may define details of transmission and reception of bits on such a physical medium, such as for example bit timing, signal encoding, and/or properties of such physical medium, among other details. In effect, a PMD operates at an effective data rate, which may be lower or slower than a selected fixed data rate of a MAC.

SUMMARY

An apparatus relates generally to a channelized communication system. In such an apparatus, a controller is configured to generate a read signal and a switch control signal. Channelized buffers are configured to receive data words from multiple channels associated with groups of information and the read signal for reading out the data words from the channelized buffers. A switch is configured to receive the data words from the channelized buffers responsive to the read signal. The switch is configured to insert a gap between the groups of information and to selectively insert one or more control words in the gap responsive to the switch control signal. The switch control signal has indexes for selection of the data words and the control words.

A method relates generally to a channelized communication system. In such a method, a read signal and a switch control signal are generated by a controller. Received by channelized buffers are data words from multiple channels associated with groups of information and the read signal. The data words are read out from the channelized buffers responsive to the read signal. A switch receives the data words from the channelized buffers responsive to the read signal. A gap is inserted between the groups of information by the switch. One or more control words are selectively inserted in the gap by the switch responsive to the switch control signal. The switch control signal has indexes for selection of the data words and the control words.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIG. 1-2 is a flow diagram depicting an example of a dual scheduling system flow for the dual scheduling system of FIG. 1-1.

FIG. 2 is a block diagram depicting an example of a control scheduler for the dual scheduling system of FIG. 1-1.

FIGS. 4-1 and 4-2 are block diagrams depicting an example of an index sequence before expansion and after expansion, respectively, by an expanded index converter of the control scheduler of FIG. 2.

FIG. 9-1 is a flow diagram depicting an example of an expanded buffer read scheduler flow for the expanded buffer read scheduler of FIG. 8.

FIG. 9-2 is a table diagram depicting an example of a state table for the expanded buffer read scheduler flow of FIG. 9-2.

DETAILED DESCRIPTION

Figure 1:
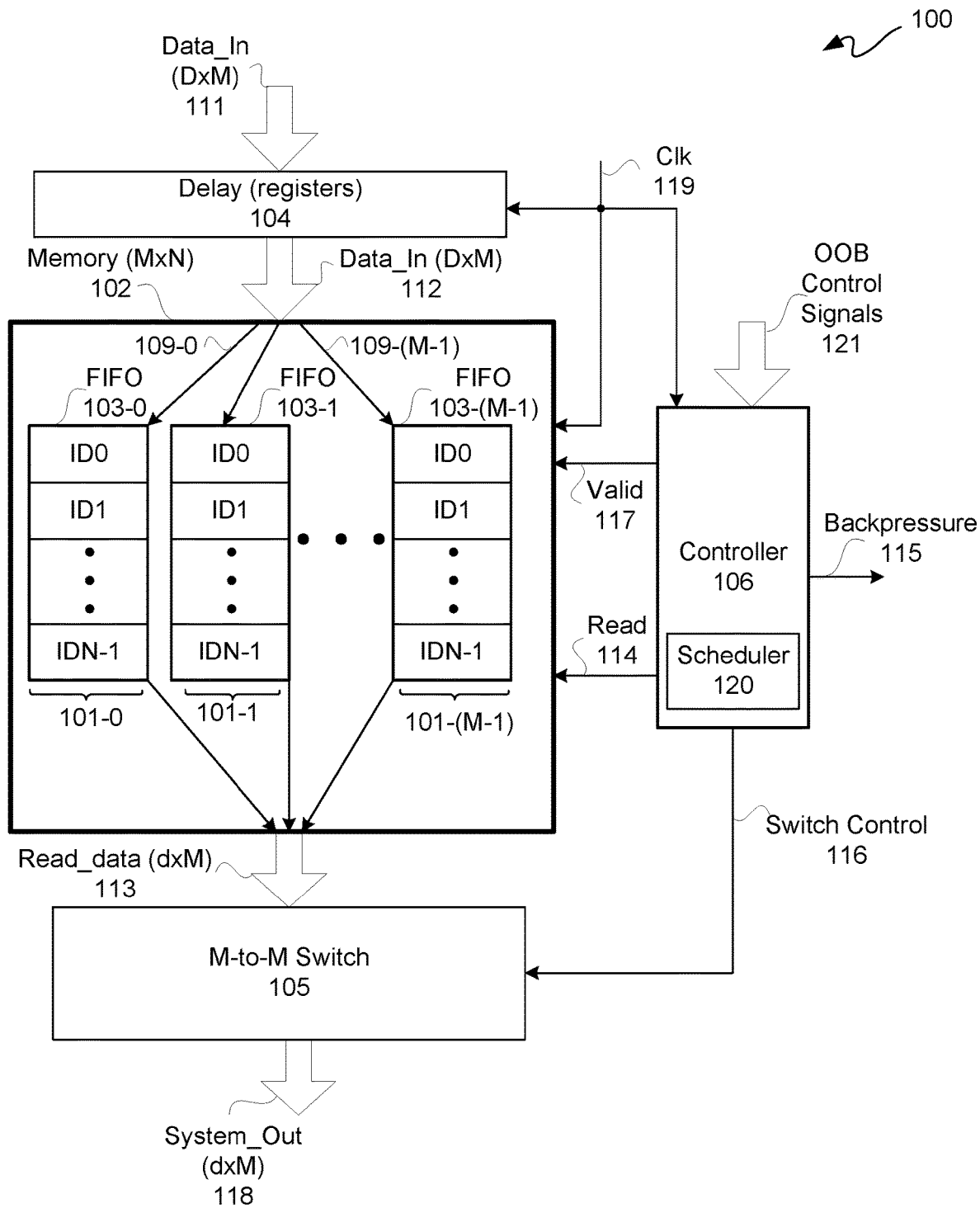
FIG. 1-1 is a block diagram depicting an example of a dual scheduling system for a channelized communication system.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Before describing the examples illustratively depicted in the several figures, a general introduction is provided to further understanding.

Channelized networks, such as a channelized Ethernet, allows a single data link to carry different Ethernet traffic, while providing partitioned bandwidth and transmission scheduling. For channelized traffic over a single data link, such as a single transmission physical medium (e.g., cable, fiber optic, twisted pair, and others), a rate adapter may be used to maintain one or more context tables for each channel. Unfortunately, conventionally storing contexts, as well as associated context logic circuitry, is complex and involves large amount of circuitry. Such complexity and large resource utilization may create timing closure and congestion issues in a channelized communication system.

As described below in additional detail, data rate is adapted between a fixed data rate of a MAC and an effective data rate of a PMD for transmission. A rate adapter, and process therefor, is used to insert "IDLE" bytes ("IDLEs"), insert gaps between data frames for flow controls, and/or insert packet headers (e.g., SFD, preamble) and/or packet tails (e.g., FCS) in a channelized communication system, such as for example a time-sliced channelized MAC system. Furthermore, for packet tail insertion, such a rate adapter may be configured to insert control frames (e.g., pause frames).

While control words or frames are inserted on a transmission side, on a receive side, control words or frames are stripped out for subsequent processing of data words. While the following description is directed mainly to insertion of control words or frames on a transmission side using scheduling of indexes as provided to a switch, it should be understood that such indexing provided to a switch may be similarly used for removal of control words or frames.

With the above general understanding borne in mind, various configurations for a channelized communication system are generally described below.

FIG. 1-1 is a block diagram depicting an example of a dual scheduling system 100 for a channelized communication system. Dual scheduling system 100 is for separating a wide datapath and a control path. Such separation allows for registering, shifting and merging data words and control words with a small number of out-of-band (OOB) control signals, as well as fewer circuit resources, as described below in additional detail. Dual scheduling system 100 may include a delay 104, a memory 102, a controller 106, and a switch 105.

In this example, an input data 111, which has a D×M datapath width, is provided to a delay 104. D is a data word width for input to a column 101-0 through 101-(M−1) ("column 101"). M is a number of D-bit wide columns in a datapath. In this example, D is 64 bits, and M is an integer equal to or greater than 8. However, in another example, these or other values may be used for D and/or M.

In this example, input data 111 is clocked into delay 104 responsive to clock signal 119, such as for registering data to mimic delay associated with operation of controller 106. While this delay may be a one clock cycle latency of clock signal 119, in another example a longer latency may be used.

Input data 111 is channelized data for N channels. In this example, delay 104 is a bank of registers; however, in another example, other circuits may be used for delaying data. As described below in additional detail, in this example N may be greater than M. In other words, the number of channels N in this example is larger than the number of columns of buffers M.

In this example, delayed input data 112, such as a one clock cycle delay of clock signal 119 for example, is clocked out of delay 104 responsive to clock signal 119, and such delayed input data 112 is clocked into a memory 102. Delayed input data 112 is clocked out of delay 104 in M channelized words of 64-bits each. Accordingly, in this example, datapath width of input data 112 is 512 bits wide or long, and input data 112 is provide in parallel to respective buffers defined in memory 102.

In this example, memory 102 is a form of random access memory (RAM); however, in another example, a different type of memory, such as for example a sequential access memory (SAM), may be used. For this example, memory 102 is an array of memory cells composed of M subarrays 103-0 through 103-(M−1) ("subarray 103"), where each subarray 103 is configured as a first-in, first-out channelized buffer (FIFO) 103. In this example, each FIFO 103 is configured as shared RAM for multiple channels. Accordingly, N is a maximum number of channels that may have data presently in memory 102 at one time. Each channel may have a unique identification (ID) among such N channels. For this example, access to M datapath columns by N channels, for N greater than M, may be by round robin priority for such access. However, as many as N channels may have data in FIFOs 103 at one time. Of course, in another example, N may be equal to or less than M. However, per clock cycle of clock signal 119, only one channel ID is active for input to FIFOs 103, and thus data from channel ID0 for example is depicted as striped across FIFOs 103. Sequence of FIFOs 103 may thus correspond to sequence of data words of a packet.

While insertion of a gap between packets is described below, it should be understood that the following description pertains to other forms of groups of information for transmission of data. So, while packets are described for purposes of clarity, other groups of information, such as frames or blocks for example, may be used.

In this example of memory 102, an array of memory cells is parsed or segregated as 0 to (M−1) blocks of columns 101-0 through 101-(M−1), where each column 101 is configured to have a depth or stack height of d×N for 64-bit rows each for FIFOs 103. Each FIFO 103 in memory 102 is at least a d-by-N (d×N) dimensioned subarray of memory cells, where d is a FIFO depth per channel of N channels. FIFO depth per channel, d, for data may be determined from Equation (1a) as follows:

$$d=1+\text{ceil}(\text{delay}*\text{expansionRatio}) \quad (1a)$$

$$\text{delay}=\text{backpressure\_generation\_delay}+\text{backpressure\_response\_delay} \quad (1b)$$

$$\text{expansionRatio}= \\ (\text{max\_number\_packets\_per\_clock\_cycle}*\text{max\_expansion\_per\_packet})/(M+ \\ \text{max\_number\_packets\_per\_clock\_cycle}*\text{max\_expansion\_per\_packet}) \quad (1c)$$

In other words, FIFO depth per channel, d, is one clock cycle plus a ceiling of a product of delay from Equation (1b) multiplied by an expansionRatio from Equation (1c).

For purposes of clarity by way of example and not limitation, M may be equal to 16, and minimum packet length may be 512 bits. For 64-bit columns 101, a minimum packet length of 512 bits means use of 8 (i.e., 512/64) columns 101 for a packet, and for M equal to 16 columns of 64-bits each, two packet lengths may be processed at a time. Maximum number of packets per clock cycle of clock signal 119 may be M divided by the number of columns (i.e., 16/8), which in this example is 2. The number of packets is useful, as insertion of control words is at packet boundaries, namely before a start-of-packet ("sop") or after an end-of-packet ("eop"). Furthermore, a maximum number of packets per clock cycle indicates how many opportunities per clock cycle may be available for insertion of control words.

Even though IDLE frames, pause frames, header frames, and tail frames are described, such frames may be thought of as a grouping of words, such as 8 64-bit words per frame. Accordingly, IDLE frames, pause frames, header frames, and tail frames are used interchangeably with IDLE words, pause words, header words, and tail words. Moreover, IDLE words, pause words, header words, tail words, and/or don't care words are singly and collectively generally referred to as overhead control words.

Continuing the example, maximum expansion per packet may be equal to 24 bytes, namely 8 bytes header+4 bytes tail+12 bytes IPG (interpacket gap), or 3 64-bit columns. In networks, a minimum pause between transmitted packets or frames may be inserted, such as to allow for receiver clock recovery, as is known. In particular, Ethernet devices are configured to allow for a minimum idle period between transmitted Ethernet packets, and this minimum idle period between such transmitted Ethernet packets is known as the IPG. IDLE frames or pause frames may be inserted responsive to a receiver indicating to a transmitter to slow down transmission of data.

Continuing the above example, for a maximum expansion per packet of 24 bytes, with 8-bits per byte, 3 64-bit columns 101 may be used (i.e., (8*24)/64). In this example, backpressure generation delay is 4 clock cycles of clock signal 119, and backpressure response delay is 0 clock cycles of clock signal 119, namely data transfer is stopped in this example in the same clock cycle of clock signal 119 that backpressure signal 115 is asserted by controller 106. For this example, FIFO depth per channel, d, is equal to 3 for three clock cycles of a clock signal 119 in Equation (1a), for "ceil" a mathematical ceiling function, namely:

$$d=1+\text{ceil}((4+0)*(2*3)/(16+(2\times3)))=3 \quad (1a)$$

For purposes of clarity by way of another example and not limitation, again M may be equal to 16, and minimum packet length may be 512 bits. Again, maximum number of packets per clock cycle of clock signal 119 may be 2 (i.e., 16/8). However, in this example, maximum expansion per packet may be equal to 664 bytes, namely 8 bytes header+4 bytes tail+12 bytes IPG+10 pause frames at 64 bytes per frame. For a maximum expansion per packet of 664 bytes, with 8-bits per byte, 83 64-bit columns 101 are used (i.e., (8*664)/64). Backpressure generation delay may again be equal to 4 clock cycles of clock signal 119, and backpressure response delay may be equal to 8 clock cycles of clock signal 119. For this example, FIFO depth per channel, d, is equal to 12 clock cycles of clock signal 119 from Equation (1a), namely:

$$d=1+\text{ceil}((4+8)*(2*83)/(16+(2\times83)))=12 \quad (1a)$$

Therefore, for this example, FIFO depth per channel is 12 clock cycles of clock signal 119.

Generally, backpressure generation delay is a number of clock cycles of delay due to operation of controller 106. More particularly, from time out-of-band ("OOB") signals 121, namely signals not directly in a datapath, are received by controller 106 until a time or number of clock cycles of clock signal 119 a corresponding backpressure signal 115 is asserted by controller 106 may be backpressure generation delay. In contrast, backpressure response delay is a number of clock cycles, if any, of delay due to a downstream user circuit of such data, such as by a transmitter. More particularly, a number of clock cycles of clock signal 119 between a user circuit receiving assertion of backpressure signal 115 and time such user circuit can stop sending data. Generally, a sum of backpressure generation delay and backpressure response delay is a time between a user sending OOB signals 121 to controller 106 and a sender stopping sending data responsive to assertion of backpressure signal 115.

In this example, a first row of input data is labeled for a channel (ID0) in each FIFO 103, and a last row of input data is labeled for a channel (IDN−1) in each FIFO 103. Accordingly, data may be striped across rows for channels ID0 through IDN−1 of FIFOs 103; however, depth of each FIFO 103 is d×N, where depth d is obtained from Equation (1a) and N is a maximum number of supported channels. Therefore, stack height of each of FIFOs 103 may be greater than N in order to support additional clock cycles for clocking data out of memory 102 for rate adaptation.

Each FIFO 103 may be used for any of N channels. Input data 112 for channel ID0 for example may be bussed on one or more of data busses 109-0 through 109-(M−1) ("busses 109") for striping data words respectively to one or more of FIFOs 103.

A controller 106 may be coupled to receive clock signal 119. Controller 106 may be configured to generate a read memory (read) signal 114, a backpressure signal 115, and switch control and data type index signals ("switch control signal") 116. Controller 106 may include an internal scheduler 120. Internal scheduler 120 may be configured to decide when to read scheduling information out of a channelized index FIFO of such internal scheduler 120 for output from controller 106.

Read signal 114 may be provided from controller 106 to memory 102. Assertion of read signal 114 by controller 106 may cause a read out (read) of data 113 to FIFOs 103 for a cycle of clock signal 119, which may be from each of columns 101-0 through 101-(M−1), as a D×M bit channelized words, namely M words of 64 bits each in this example.

Read data 113 may be provided from memory 102 to an M-to-M switch ("switch") 105. Even through an M-to-M switch 105 is used, it will be understood that expansion is allowed with training of output to M.

Switch 105 may receive separate index control and data type signals, which are generally indicated as switch control signal 116 from controller 106, as described below in additional detail. Switch 105 may couple read data 113 to output data in system output 118 responsive to switch control signal 116. Output data in system output 118 may be output as D×M words, again namely M words of 64 bits each in this example.

Controller 106 may be coupled to receive OOB control signals 121. OOB control signals 121 may include a start of packet, an end of packet, a number of invalid bytes in a D-bit column, and input data valid, among other known OOB control signals 121. Controller 106 may be configured to provide input data valid signal 117 to memory 102. Memory 102 may be configured to increment write pointer signals respectively provided to FIFOs 103 responsive to input data valid signal 117 of OOB control signals 121 being asserted, such as logic high for example. Memory 102 may be configured to increment read pointer signals respectively provided to FIFOs 103 responsive to read signal 114 from controller 106 being asserted, such as logic high for example. In this example, both input data valid signal 117 and read signal 114 are M bits, namely one bit for each column 101.

While other OOB control signals 121 may be added to obtain packet information, such as for an Ethernet packet, from such a small set of OOB control signals 121, controller 106 may be configured to determine a number of IDLE frames or pause frames to insert for data scheduling. Again, there are 64 bytes per frame, and for this example, there are 8 64-bit words per frame.

Effectively, there are two scheduling operations occurring, where a second scheduling may be thought of as scheduling of a first scheduling. First or data scheduling is performed by controller 106, separate from second or control scheduling which is performed by internal scheduler 120. For data scheduling, controller 106 schedules RAM reading, namely reading of memory 102, by scheduling assertion of read signal 114. For this scheduling of reads of memory 102, controller 106 operates as a data scheduler by selectively asserting read signal 114 to read out of FIFOs 103, such as a parallel read out of a last row of data words in such FIFOs. However, for some reads a subset of a parallel read out of a last row of data words in such FIFOs 103 may be performed. Furthermore, if a remainder reaches M, then a read of a last row of data words in FIFOs 103 may be suspended for one or more clock cycles of clock signal 119. These examples of data or first scheduling are described below in additional detail.

Control scheduling is performed by internal scheduler 120. Internal scheduler 120 is configured to decide when to read indexes from a channelized indexed FIFO of internal scheduler 120 corresponding to a FIFO 103. Such second scheduling by controller 106 further includes selecting indexes and data types for controlling output of dual scheduling system 100. Effectively, control scheduling determines when to read out first scheduling information out of such a channelized indexed FIFO. Examples of first and second scheduling are provided below in additional detail.

It should be noted that an M-column channelized FIFO provided by memory 102 is unlike a conventional FIFO, as such M-column channelized FIFO provided by memory 102 does not use a fill level calculation. Rather controller 106 is configured to pre-calculate a fill level, and such data FIFOs 103 only have their respective write pointers incremented responsive to input data valid 117 being asserted and their respective read pointers incremented responsive to read signal 114 being asserted.

Figures 1, 2:
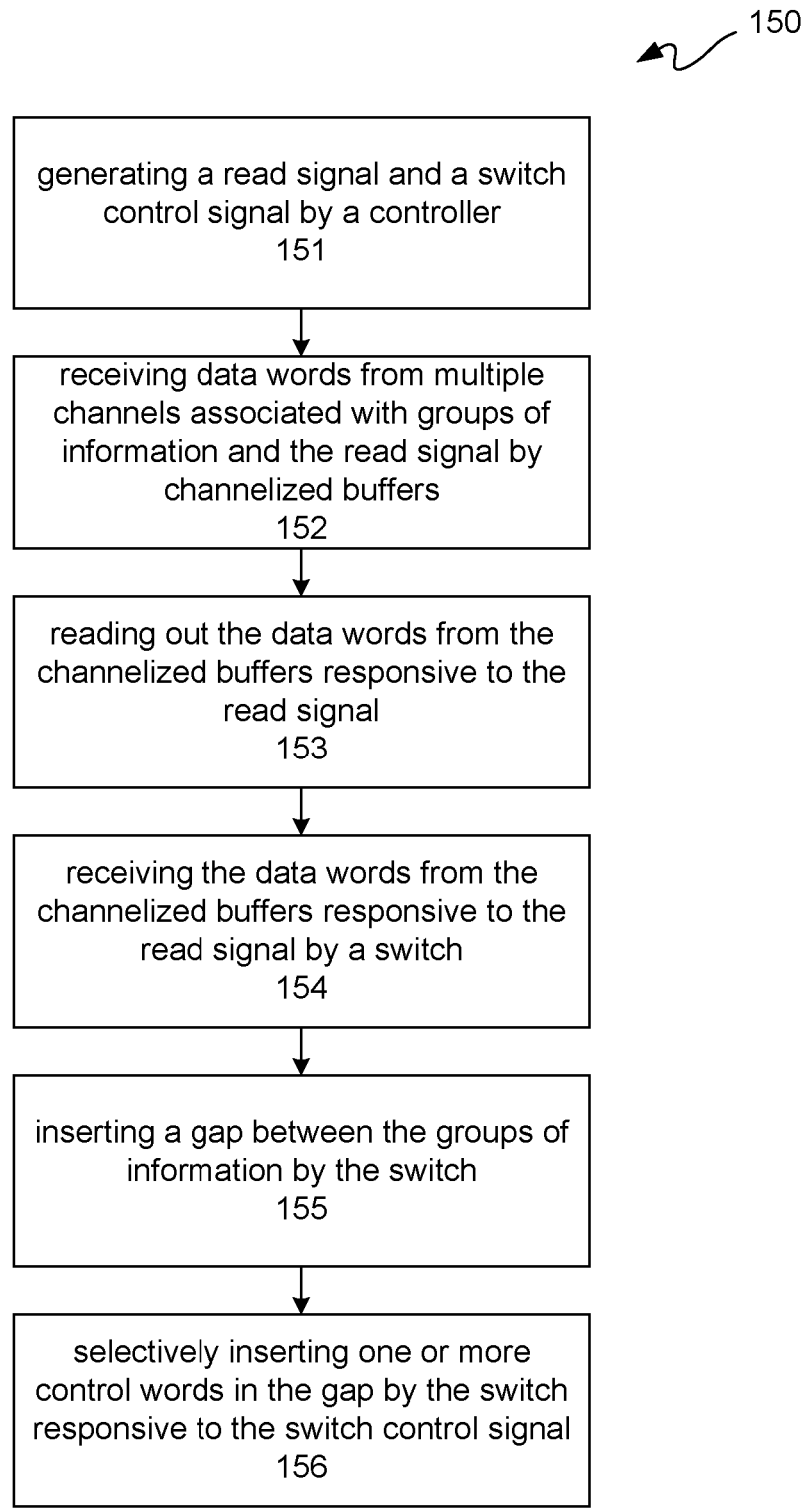
Figure 2:
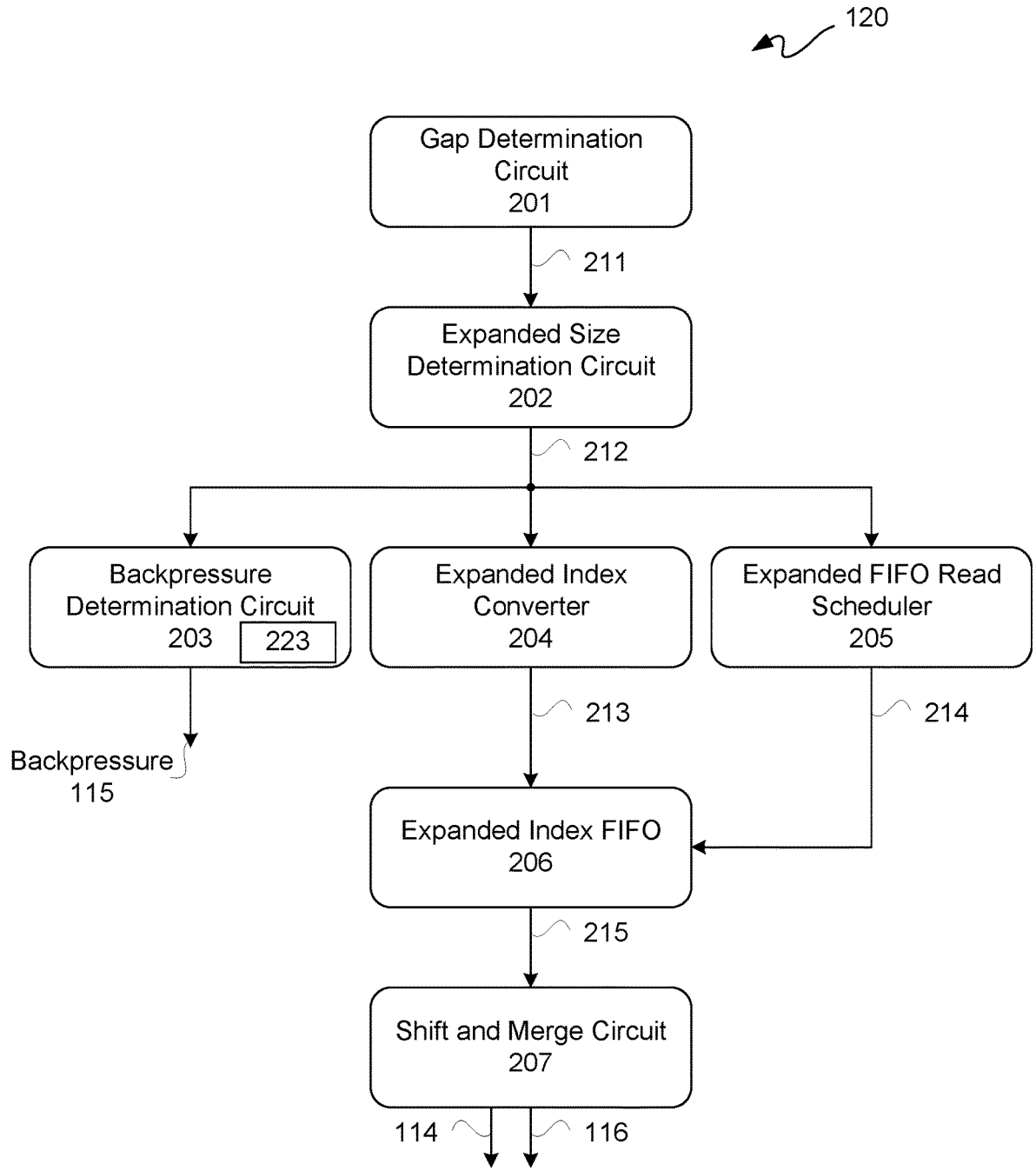

FIG. 1-2 is a flow diagram depicting an example of a dual scheduling system flow 150 for dual scheduling system 100 of FIG. 1-1. With simultaneous reference to FIGS. 1-1 and 1-2, dual scheduling system flow 150 is further described.

At operation 151, a read signal 114 and a switch control signal 116 are generated by a controller 106. At operation 152, data words are received from multiple channels associated with groups of information and read signal 114 by channelized buffers 103. Such groups of information may be packets or frames for example.

At operation 153, data words are read out from channelized buffers (103) responsive to read signal 114. At 154, data words are received from channelized buffers (103) responsive to read signal (114) by a switch (105).

At operation 155, a gap is inserted between groups of information by switch 105. At operation 156, one or more control words is/are selectively inserted in such gap by switch 105 responsive to switch control signal 116. Switch control signal 116 has indexes for selection of data words and/or control words.

FIG. 2 is a block diagram depicting an example of an internal scheduler 120. Internal scheduler 120 is further described with simultaneous reference to FIGS. 1-1 through 2. Internal scheduler 120 may include a gap determination circuit 201, an expanded size determination circuit 202, a backpressure determination circuit 203, an expanded index converter 204, an expanded FIFO read scheduler 205, an expanded index FIFO 206, and a shift and merge circuit 207.

Gap determination or calculation circuit 201 may be configured to calculate an IPG, header and/or other gaps to be inserted for the next packet in input data 111. OOB signals 121 indicate which column is an sop data word and which column is an eop data word for packet data written into FIFOs 103. This allows a predictive determination by gap determination circuit 201 as to whether and, if so, where a gap or gaps can be inserted, provided there is a chance to insert a gap. For example, if an index p is an eop word and a next index p+1 is an sop word, then between indexes p and p+1 a gap can be inserted.

Furthermore, OOB signals 121 may indicate whether one or more IDLE frames are to be inserted along with pause, header and/or tail frames, or other control overhead between packets. A standard number of IDLE frames for insertion between Ethernet packets is 12; however, this or another number of IDLE frames may be inserted. Gap determination circuit 201 may be configured to use information from OOB signals 121 to provide a sum of these control words to be inserted in such a predicted gap between packets. A sum signal 211 of control words to be inserted output from gap determination circuit 201 may be input to expanded size determination or calculation circuit 202. Insertion of one or more control words between packets may result in a shift in output position of an sop word, as described below in additional detail, causing an expansion. This effectively means that indexes provided to switch 105 may be expanded over the number of M columns or parallel FIFOs 103, even though memory 102 is channelized for input of M data words and switch 105 is for parallel output of M words.

By using indexes for expansion rather than for providing a wider datapath for additional words, less circuit resources and power are used. For example, for M equal to 8, 3-bit indexes (i.e., 2^3) may be used. This expansion is generally 3-bits multiplied by M, which is to be contrasted with providing expansion with 64-bits multiplied by M. In short, using circuit resources for handling three bits is substantially less than using circuit resources for handling 64 bits in expanded sequences. In particular, for an FPGA implementation, a reduction in circuit resources may allow for a smaller and less expensive FPGA to be used.

Expanded size determination circuit 202 may be configured to calculate an expanded datapath size. Expanded size determination circuit 202 may be implemented with circuitry to add M to a sum from sum signal 211.

For example, input OOB control signals 121 may include an sop signal asserted following an eop signal indicating that a packet is to have an IPG. Assuming for purposes of clarity by way of example and not limitation, such an IPG to be inserted is 8 bytes, the next packet will have an 8 byte header. Along those lines, data size is increased from M 8-byte words to "M+2" 8-byte words, namely an expanded value or size for M. An expanded size 212 output from expanded size determination circuit 202 may respectively be input to backpressure calculation or determination circuit 203, expanded index converter 204, and expanded FIFO read scheduler 205.

Backpressure determination circuit 203 may be configured with an accumulator 223 to increment responsive to a number of 8 byte remainder words equal to or in excess of M. Basically, a number of gaps inserted may cause a remainder of words from a packet to be pushed back to a next clock cycle, and this remainder may accumulate to be equal to or greater than M. For a remainder equal to or greater than M, backpressure signal 115 may be asserted by backpressure determination circuit 203 to inform a provider of data input 111 to slow down or delay further input. For example, for a remainder M, there is at least one stripe of data words across FIFOs 103 pending, so no more input data should be input on a next clock cycle, so a provider of input data may be informed to hold off supplying additional data. A round robin arbiter providing access to channels to M slots on a datapath may thus be informed not to allow any more input data for at least one clock cycle. Whether one or more than one clock cycle delay of providing input data is to be used may depend on an accumulation of gaps.

Again, use of backpressure determination circuit 203 is to be contrasted with a conventional FIFO method, in which a fill or threshold level used to control backpressure decrements when such FIFO does not receive data input. In contrast, an accumulator of backpressure determination circuit 203 is configured to decrement immediately for each non-zero value read out for an expanded size to reduce or minimize impact of data input response latency.

Figure 3:
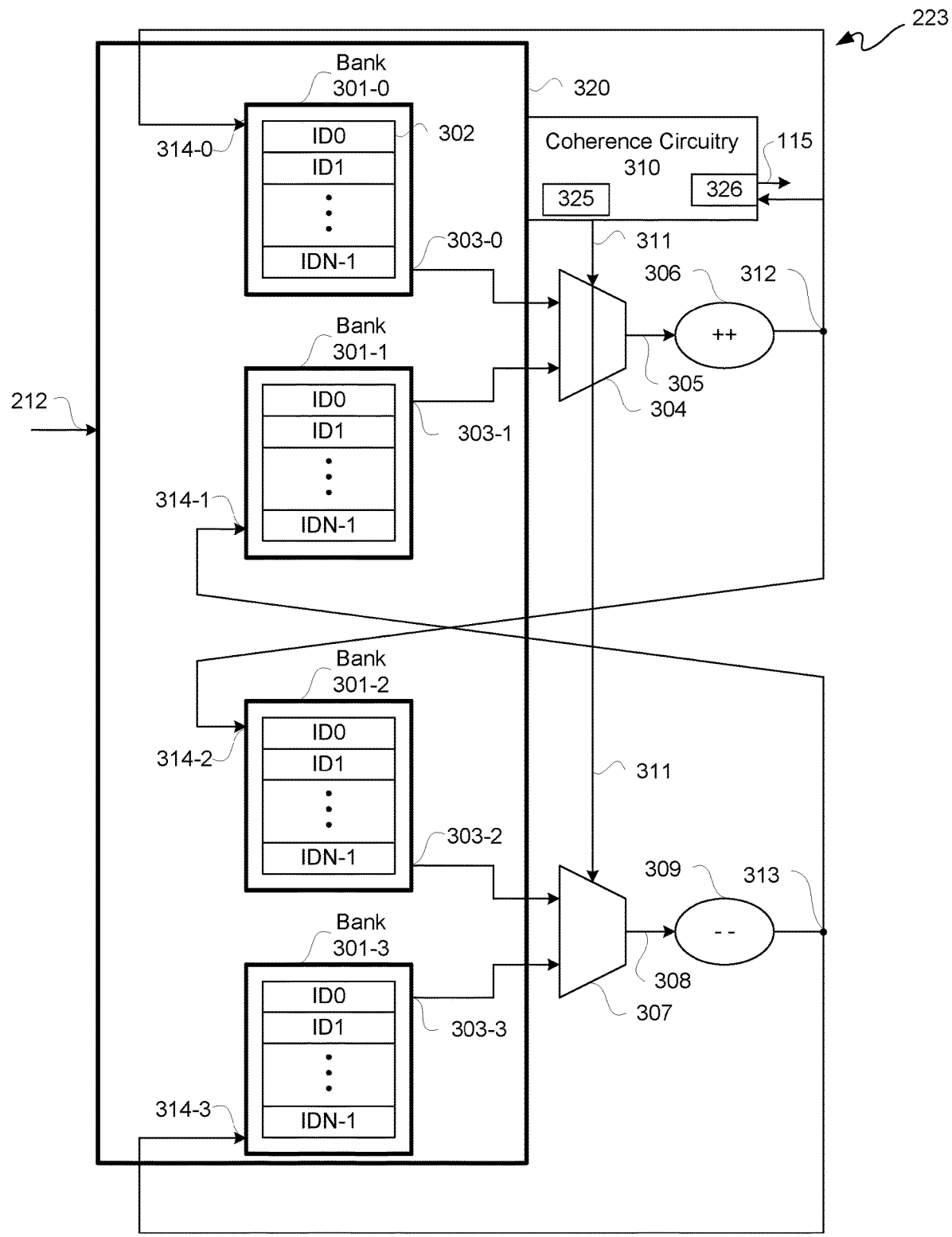
FIG. 3 is a block-circuit diagram depicting an example of a backpressure accumulator for the control scheduler of FIG. 2.

FIG. 3 is a block-circuit diagram depicting an example of a backpressure accumulator 223. Backpressure accumulator 223 may be used as an accumulator in backpressure determination circuit 203. In this example, accumulator 223 may be implemented using a memory 320. In this example, memory 320 is a quad port RAM; however, other types of memory may be used in other examples, such as multi-port SAM for example. Known details regarding a quad port RAM are not described in unnecessary detail for purposes of clarity and not limitation.

In this example, memory 320 is divided out into four memory banks 301-0 through 301-3. Banks 301-0 through 301-3 may be formed of subarrays of memory cells of memory 320. Each of banks 301 may be configured for storing an accumulated value for a corresponding channel having data in FIFOs 103.

Each bank 301 may be configured with a stack of rows 302 of memory cells, where each row 302 corresponds to an ID. Along those lines, each bank 301 may be configured to correspond to a FIFO 103 having N rows for having a stack of ID0 through IDN−1 rows 302 in each bank 301. Accumulator 223 may have uncorrelated increment ID and decrement ID, and so write ports 314-0 through 314-3 and read ports 303-0 through 303-3 of a quad port memory 320 are used corresponding to banks 301-0 through 301-3. Dual sets of memory banks are used to allow for a most current value to be written back while reading another value. This allows a newer value to be buffered.

For purposes of clarity and not limitation, coherence circuitry 310 is generally indicated as coupled to memory 320. Coherence circuitry 310 may include a separate register array 325 configured to record which of banks 301 has the latest value for each channel ID and may be configured to generate a select signal 311. Select signal 311 may be transmitted to multiplexers 304 and 307 to identify where a previous remainder value for a channel is located.

Each value respectively read out from read ports 303-0 and 303-1 from banks 301-0 and 301-1, respectively, may be input to multiplexer 304. Output 305 from multiplexer 304 selected responsive to select signal 311 is a previous remainder value for a channel ID. A current expanded size 212 may be written to bank 301-0 for a channel ID to indicate a current "credit" or amount of data in FIFOs 103. Output 305 is input to incrementer 306 for increment of 1 for each write clock cycle to memory 102, and an incremented output 312 of incrementer 306 is fed back to each of write ports 314-0 and 314-2 of banks 301-0 and 301-2, respectively, as a current expanded size.

Similarly, each value respectively read out from read ports 303-2 and 303-3 from banks 301-2 and 301-3, respectively, may be input to multiplexer 307. Output 308 from multiplexer 307 selected responsive to select signal 311 is a previous remainder value for a channel ID. Output 308 is input to decrementer 309 for a decrement of 1 for each read clock cycle from memory 102, and a decremented output 313 of decrementer 309 is fed back to each of write ports 314-1 and 314-3 of banks 301-1 and 301-3, respectively, as a current expanded size. A current expanded size based on incremented output 312 or decremented output 313 may be fed back as a feedback signal.

Effectively, as data and control words are clocked into and out of memory 102, an expanded size, namely a remainder of data words associated with a channel, may be incremented and decremented, respectively. If this remainder of data words equals or exceeds M, a backpressure signal 115 may be asserted. Coherence circuitry 310 may further include a comparator 326 configured to compare a current expanded size 312 output from adder or incrementer 306 to M to determine whether to assert backpressure signal 115.

However, even though backpressure signal 115 may be asserted, there is no wait state for a user to respond to by suspending or slowing sending of data. Rather, in anticipation of such suspending or slowing sending of data, a current expanded size may be decremented. As each memory bank store is indexed to a channel, each such channel may have an "account credited" to indicate how much data for such channel is in FIFOs 103, and such "credited account" may be reduced back down to zero responsive to a channel having no data in FIFOs 103. In this example, an amount of credit is limited to a remainder size of M.

Returning to FIGS. 1-1 and 2, output of backpressure determination circuit 203 of scheduler 120 may be backpressure signal 115 output from controller 106.

Expanded index converter 204 may receive expanded size 212 and be configured to map an index of input data 111 to an expanded data index. Expanded index converter 204 may be implemented to insert one or more don't care word indexes between an eop index and an sop index. Again, each channel has an ID, and thus each channel has an index associated with input data 111 for such channel.

Figures 1, 4:
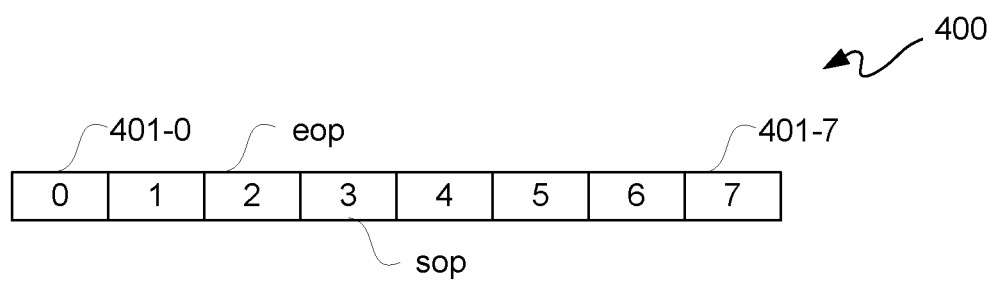
Figures 2, 4:
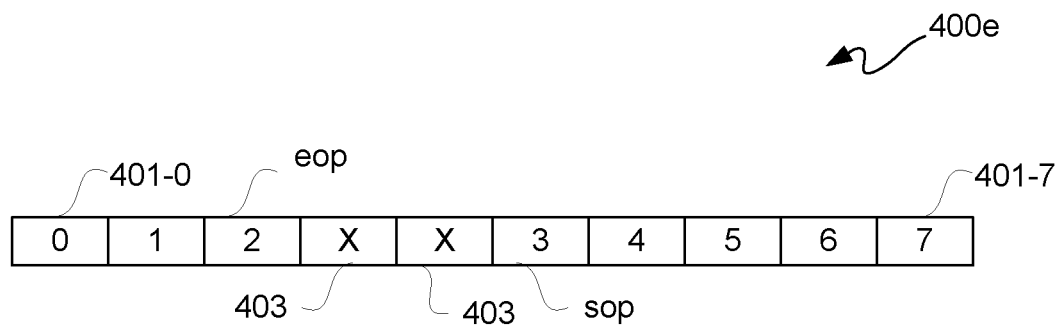

For purposes of clarity by way of example and not limitation, FIGS. 4-1 and 4-2 are block diagrams depicting an example of an index sequence 400 before expansion and 400e after expansion, respectively, by an expanded index converter 204. Though an expanded index conversion is for M equal to 8 is illustratively depicted, it should be understood that other values for M and/or other insertions of don't cares may be used in other examples.

With reference to non-expanded index sequence 400, namely an index sequence before expansion, as depicted in FIG. 4-1, there are 8 indexes 401, generally word indexes 401-0 through 401-7. In this example, word index 401-2 is an eop word index, and word index 401-3 is an sop word index.

With reference to index sequence 400e, namely index sequence 400 of FIG. 4-1 after expansion, as depicted in FIG. 4-2, there are still 8 word indexes 401-0 through 401-7; however, inserted between eop word index 401-2 and sop word index 401-3 are two "don't care" ("X") word spacer indexes 403. Accordingly, size of an expanded index sequence 400e in this example has expanded from 8 to 10; however, an output index is still constrained to M, as described below in additional detail. Continuing the above example, word spacer indexes 403 do not represent actual data, but may be inserted for purposes of placeholders for insertion of control overhead.

Returning to FIGS. 1-1 and 2, output of expanded index converter 204 of scheduler 120 may be an expanded or non-expanded input index sequence 213. Input index sequence 213 may be provided to expanded index FIFO 206 for buffering. Expanded index FIFO 206 may be a channelized FIFO configured to store both expanded and non-expanded index sequences. Even though a non-expanded index sequence 213 may be received, expanded index FIFO 206 may be configured to be extended for each stack row to handle expanded index sequences 213. Depth per channel, d, for such a channelized expanded index FIFO 206 may be determined from Equation (1a) above.

Expanded FIFO read scheduler 205 may receive expanded size 212, which may be zero for no expansion, for determining scheduling reads out of expanded index FIFO 206. A read or read "enable" signal 214 may be asserted by expanded FIFO read scheduler 205 to cause expanded index FIFO 206 to read out an expanded output index sequence 215. An example of an expanded FIFO read scheduler 205 is described below in additional detail.

FIFO depth per channel, d, for indexes for expanded index FIFO 206 may be determined from Equations (1a) through (1c) as previously described. Sequences of indexes may have to be merged, where such sequences may represent two different clock cycles, which is to be contrasted from data clocked into and out of FIFOs 103. In other words, when reading out from expanded index FIFO 206, a sequence spanning more than one clock cycle may be present. However, such a sequence may be for one clock cycle, but an expanded sequence may straddle more than one clock cycle. Along those lines, consecutive reads may be used to provide a sequence of indexes. Furthermore, a +1 in Equation (1a) is effectively in a context memory of an expanded FIFO read scheduler 205, as described below in additional detail.

Each expanded index or non-expanded output index sequence 215 read out from expanded index FIFO 206 may be provided to shift and merge circuit 207. Shift and merge circuit 207, which may be implemented in part with a shift register, may be configured to shift and merge an expanded or non-expanded output index sequence 215 to form an array of M indexes, per column for example, with each output index sequence constrained to M. Shift and merge circuit 207 may be configured to provide switch control signal 116. Shift and merge circuit 207 may further be configured to provide read signal 114 with switch control signal 116.

Figure 5:
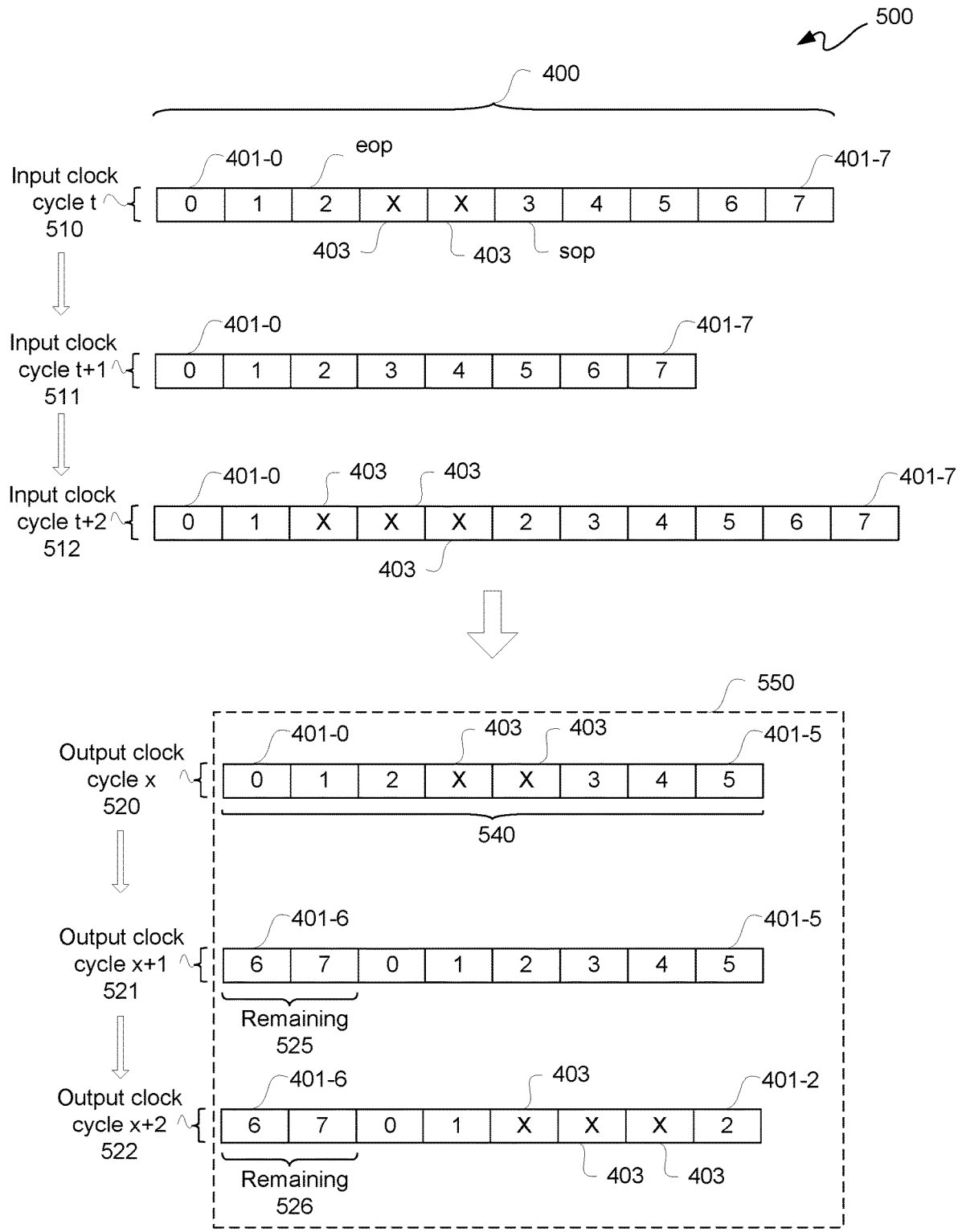
FIG. 5 is a block-flow diagram depicting an example of an expansion of a sequence of indexes and shift and merge flow.

For purposes of clarity by way of example and not limitation, FIG. 5 is a block-flow diagram depicting an example of an expansion of a sequence of indexes and a shift and merge flow 500. Flow 500 may be operations carried out by expanded index FIFO 206 and shift and merge circuit 207 of FIG. 2, and accordingly flow 500 is further described with simultaneous reference to FIGS. 1-1 through 5.

For flow 500, a sequence of "input" clock cycles, such as of clock signal 119, are indicated as t, t+1, and t+2, and a corresponding sequence of "output" clock cycles, such as of clock signal 119, are indicated as x, x+1, and x+2. At input clock cycle t 510, an output index sequence 215, which in this example is expanded index sequence 400e as previously described with reference to FIG. 4-2, is read out of expanded index FIFO 206 responsive to assertion of read signal 214 and a cycle of clock signal 119. In this example, size of such an expanded index sequence 215 at 510 is 10, which is two more than M equal to 8 of data input 111 continuing the above example.

At input clock cycle t+1 511, another output index sequence 215, which in this example is non-expanded index sequence 400 as previously described with reference to FIG. 4-1, is read out of expanded index FIFO 206 responsive to assertion of read signal 214 and a cycle of clock signal 119, and provided as an input to shift and merge circuit 207. Size of this non-expanded index sequence 215 at 511 is 8, which is equal to M continuing the above example.

At input clock cycle t+2 512, another output expanded index sequence 215 is provided as an input to shift and merge circuit 207. In this example, this other expanded index sequence 215 has 8 indexes 401-0 through 401-7 but with three don't care indexes 403 inserted between indexes 401-1 and 401-2. Size of this other expanded index sequence 215 at 512 is 11, which is three more than M for the above example.

At output clock cycle x 520, an output constrained index sequence 540 is provided as an example of an output constrained index sequence of switch control signal 116 output from shift and merge circuit 207. Shift and merge circuit 207 may be configured to assert read signal 114 consistent with and prior to assertion of output constrained index sequence 540 of switch control signal 116.

Output constrained index sequence 540 is an example of a portion of expanded index sequence 400e for input clock cycle t at 510. Because each output index sequence in switch control signal 116 is constrained to M indexes, output index sequence 540 is a first 8 indexes, namely indexes 401-0 through 401-5 with two don't care indexes 403 inserted between indexes 401-2 and 401-3 in this example. A remaining two indexes, namely indexes 401-6 and 401-7 of expanded index sequence 400, are held back for a next output clock cycle. Accordingly, data words of a packet may straddle successive clock cycles of clock signal 119.

At a next output clock cycle x+1 521, another output index sequence of switch control signal 116 is output from shift and merge circuit 207. This example of an output index sequence includes at the front such two remaining indexes 525 from expanded index sequence 400e, namely indexes 401-6 and 401-7, from a previous output clock cycle x. Following index 401-7 is a sequence of five indexes 401-0 through 401-5 corresponding to non-expanded index sequence of input clock cycle t+1. However, again there are a remaining two indexes, namely indexes 401-6 and 401-7 of a non-expanded index sequence of input clock cycle t+1, which are held back for a next output clock cycle.

At a next output clock cycle x+2 522, another output index sequence of switch control signal 116 is output from shift and merge circuit 207. This example of an output index sequence includes at the front such two remaining indexes 526, namely indexes 401-6 and 401-7 from non-expanded index sequence of input clock cycle t+1, from a previous output clock cycle x+1. Following index 401-7 is a sequence of indexes 401-0 and 401-1, followed by three don't care spacer indexes 403, and then lastly index 401-2 corresponding to an expanded index sequence of input clock cycle t+2. However, again there are a remaining number of indexes, namely indexes 401-3 through 401-7, held back for a next output clock cycle.

Accordingly, a maximum number of data words that may be input to FIFOs 103 on a clock cycle of clock signal 119 is an integer number M. Furthermore, a maximum number of data words, control words, or a combination of data and control words that may be output from switch 105 on a clock cycle of clock signal 119 is the integer number M. Additionally, such integer number N of supported channels may be greater than the integer number M, where an arbiter, such as a round robin or other priority arbiter (not shown) allows selectively controlled access of each channel ID to provide data words for transmission on such channel ID as input data 111.

Figure 6:
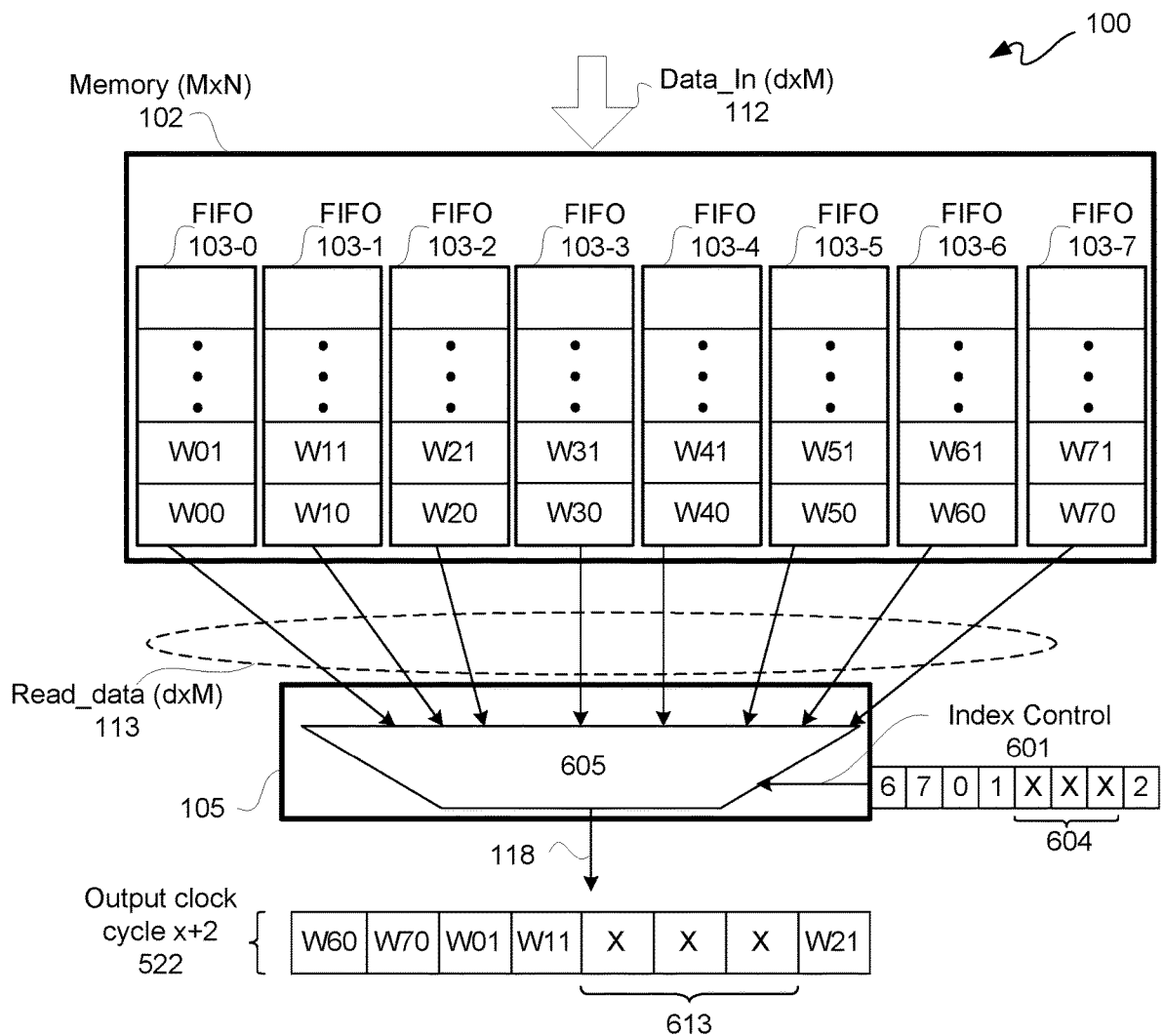
FIG. 6 is a block diagram depicting a use example of a memory coupled to an M-to-M switch of the dual scheduling system of FIG. 1-1.

FIG. 6 is a block diagram depicting a use example of a memory 102 coupled to an M-to-M switch 105 of dual scheduling system 100 of FIG. 1-1. For purposes of clarity by way of example and not limitation, examples of data words W00, W10, . . . , W70 on a last row of FIFOs 103 and W01, W11, . . . , W71, on a second to last row of FIFOs 103, respectively buffered in FIFOs 103-0 through 103-7 of memory 102 are illustratively depicted. In this example, data words W01 through W71 respectively buffered in FIFOs 103-0 through 103-7 of memory 102 are on a later clock cycle of clock signal 119 as buffered respectively behind data words W00 through W70 as illustratively depicted.

Data words of read data 113 are provided as respective data inputs to a switch 605 of M-to-M switch 105. An index control signal 601 of switch control signal 116 may be provided as having an index to a word or indexes to words to cause switch 605 to select corresponding data word or words for parallel output. Index control signal 601 may be provided from output indexes constrained to M for a clock cycle of clock signal 119, as previously described. Index control signal 601 may be combined with a data type signal; however, for purposes of clarity and not limitation, a separate data type signal is described below. Again, continuing the above example of M equal to 8, system output 118 is depicted as an output of 8 words, which may be a parallel output.

System output 118 is responsive to a group of M output indexes of index control signal 601. In this example, indexes are 6, 7, 0, 1, X, X, X, and 2. These indexes correspond to words W60, W70, W01, W11, X, X, X, and W21, respectively, in the prior example. Don't care words X may be inserted to provide a gap between packets.

Words W60, W70, W01, W11, and W21 are respectively from FIFOs 103-6, 103-7, 103-0, 103-1, and 103-2; however, three don't cares X words 613 may be from another portion of switch 105, as described below in additional detail. In this example, data words W60 and W70 are remainders from a previous clock cycle, and data words W01, W11, and W21 are provided for a current clock cycle. However, between data words W11 and W21 are three don't care words X 613. In short, output between any two FIFOs, such as output between FIFOs 103-1 and 103-2 in this example, may have one or more gaps in data inserted. In this example, a gap 604 is provided by insertion of multiple don't care indexes 403 for insertion of corresponding don't care words 613; however, one or more don't cares words and/or other control words or frames may be inserted between outputs of successive FIFOs, including between a last FIFO 103-7 and a first FIFO 103-0.

This example of system output 118 is for output clock cycle x+2 522. However, it should be understood that these words and indexes are just an example, and these and/or other words and/or indexes may be used in other examples.

Accordingly, words may be shifted with insertion of one or more don't care words due to expansion beyond M prior to output. Furthermore, one or more words from a previous clock cycle may be merged with one or more words of a current clock cycle. This shifting and merging is reflected in an index sequence of index control signal 601, which is output from shift and merge circuit 207 as part of switch control signal 116.

Indexes of index control signal 601 may be provided to switch 605 to control readout of channelized data FIFOs 103 to provide system output 118 from switch 605. Don't care words output in system output 118 may be provided from a separate portion of switch 105, and such don't cares may be masked by IDLE, header, tail, or other control frames or words, as described below in additional detail with reference to selection and output of data types.

Figure 7:
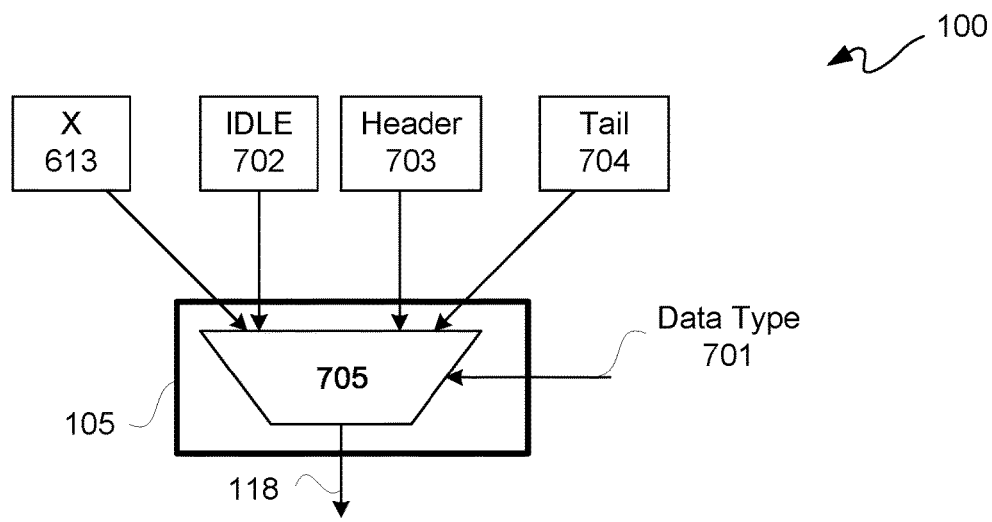
FIG. 7 is a block diagram depicting an example of a masking switch of a switch of the dual scheduling system of FIG. 1-1.

FIG. 7 is a block diagram depicting an example of a masking switch 705 of switch 105 of dual scheduling system 100. A data type signal 701 of switch control signal 116 may be provided as a control select input to masking switch 705. In this example, masking switch 705 is a multiplexer; however, in other examples, other types of switch circuitry may be used. Masking switch 705 may be part of switch 105 following data switch 605.

A data type signal 701 provided from controller 106 may be used to mask or select a don't care word or words 613. OOB control signals 121 may indicate a number of IDLE frames to be inserted between packets, as well as configuration of header and tail frames.

With respect to masking a don't care word or words 613, an IDLE frame, a tail frame, a header frame, or other control frame may be selected responsive to data type signal 701. In this example, an IDLE frame 702, a header frame 703, a tail frame 704, and a don't care word 613 are used as respective inputs to masking switch 705.

In this example, data type signal 701 causes multiplexer 705 to select one of a: don't care word 613, IDLE frame 702, header frame 703, or a tail frame 704 as part of system output 118 between eop and sop words of consecutive packets. In the above example, don't care indexes 403 in data type signal 701 were used for selection of don't care words 613. However, indexes in data type signal 701 may be used for selection of an IDLE frame 702, header frame 703, or tail frame 704 responsive to data type signal 701, and such selection may mask a don't care word or words 613.

An IDLE frame 702, header frame 703, or tail frame 704 in this example may be inserted on-the-fly in place of one or more don't care words 613 with storing only single instances of each of such IDLE frame 702, header frame 703, and tail frame 704 downstream of FIFOs 103, which reduces having to store such frames in multiple instances throughout FIFOs 103. By performing such insertion in a last switching stage of dual scheduling system 100, use of internal storage, such as RAM, registers, or the like, for gap insertion may be avoided.

In this example of system output 118 of FIG. 6, data type signal 701 is used to select three don't care words 613 for insertion. In such example, don't care word indexes 403 may be used to provide data type signal 701 for insertion of one or more don't care words 613.

Figure 8:
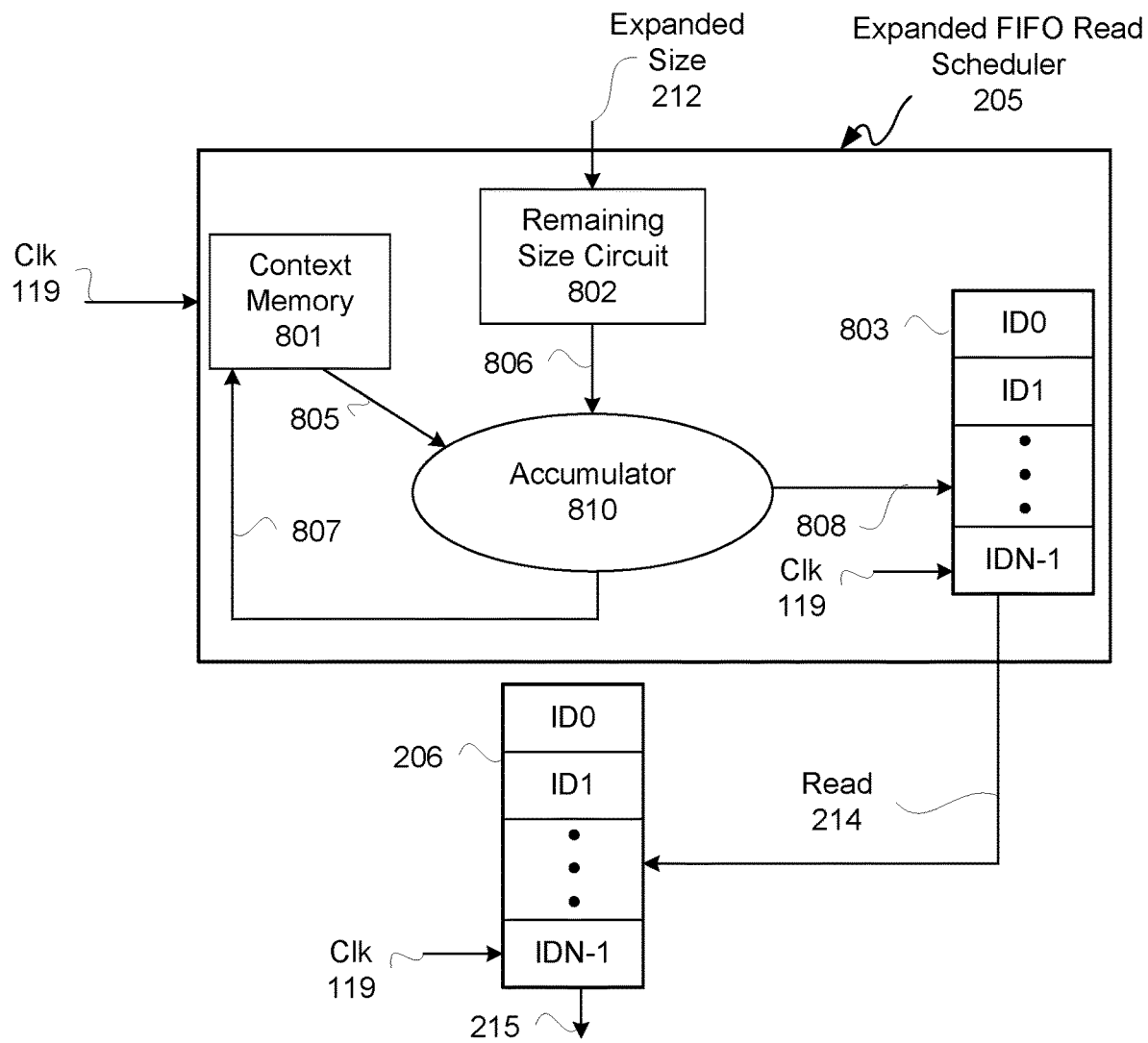
FIG. 8 is a block diagram depicting an example of an expanded buffer read scheduler.

FIG. 8 is a block diagram depicting an example of an expanded FIFO read scheduler ("read scheduler") 205. As previously described, a remaining size or number of words from a current output may exist. This number of remaining words may be determined by remaining size circuit 802 of read scheduler 205 to provide a remaining size signal 806 to accumulator 810 of read scheduler 205. Remaining size circuit 802 may be configured to receive an expanded size signal 212 and to subtract M from a value of such expanded size value to obtain a remaining size.

Index expansion may result in one or more remainders, and such remainders may be accumulated by accumulator 810. Accumulator 810 may be implemented as an adder for example.

Once a size of an accumulated remainder in accumulator 810 equals M, a shift and merge circuit 207 may not need an index array popped out from expanded index FIFO 205 as output index sequence 215 to form an array of M indexes, such as to form an M-column output index constrained to M. To break out of a FIFO output accumulation to FIFO popping dependency, a popping schedule of an index FIFO 103 is predicted in read scheduler 205. In other words, once an accumulated remainder equal to or greater than M is waiting, such accumulated remainder gets processed for a next data word from a FIFO 103.

Read scheduler 205 is configured to accumulate a remaining size from remaining size signal 806. A feedback output of accumulator 810, which may be an intermediate accumulated result, is provided to context memory 801 of read scheduler 205. Depth of context memory 801 may be 1×N. Context memory 801 may store channel IDs in association with a stored remaining size for such channels. Output 805 of context memory 801 responsive to clock signal 119 may be provided to accumulator 810 for accumulation with a current remaining size 806.

Accumulated output of accumulator 810 may be provided as a read pointer signal 808 to control scheduler FIFO 803. In this example, control scheduler FIFO 803 of read scheduler 205 has a depth of d'×N, where d' is determined from Equation (2), as follows:

$$d'=\text{ceil}[((M-1)+\text{delay}*\text{max\_number\_packets\_per\_clock\_cycle}*\text{max\_expansion\_per\_packet})/M], \quad (2)$$

where delay in Equation (2) is the same as in Equation (1b). Output of control scheduler FIFO 803 is read "enable" signal or read signal 214. Control scheduler FIFO 803 outputs read signal 214 responsive to clock signal 119. In this example, control scheduler FIFO 803 is configured similarly to a FIFO 103 of channelized FIFOs 103, namely a d×N FIFO, but where depth d is determined as in Equation (1a) and where 1-bit is stored, namely to read 1 or not read 0 from a channel ID pointed to by read pointer signal 808. Effectively, control scheduler FIFO 803 is N small FIFOs each with depth d and 1-bit wide in this example. A 1-bit width may be used as only read or don't read is used per clock cycle. However, in an example of 2M input and output, namely a buffer memory 102 sufficiently large for two clock cycles at a time, then more than a 1-bit wide control scheduler FIFO 803 may be used. Stated another way, when the maximum extra control information inserted in a datapath width is less than such data path width in one clock cycle, then control scheduler FIFO 803 width may be only 1-bit wide; otherwise, for the maximum extra control information inserted in a datapath width equal to or greater than such data path width in one clock cycle, then control scheduler FIFO 803 width may be wider than 1-bit wide.

Expanded index FIFO 206 may be configured similarly to a FIFO 103 of channelized FIFOs 103, namely a d×N FIFO, but where depth d is determined as in Equation (1a) and where only indexes, such as 3-bit indexes in an example, are stored. In other words, expanded index FIFO 206 may be a d×N FIFO, where d is a FIFO depth per channel for N channels as determined using Equation (1a).

Expanded index FIFO 206 is configured to receive clock signal 119 and read signal 214. In response, expanded index FIFO 206 outputs index sequence 215 to form an array of M indexes.

Figures 1, 9:
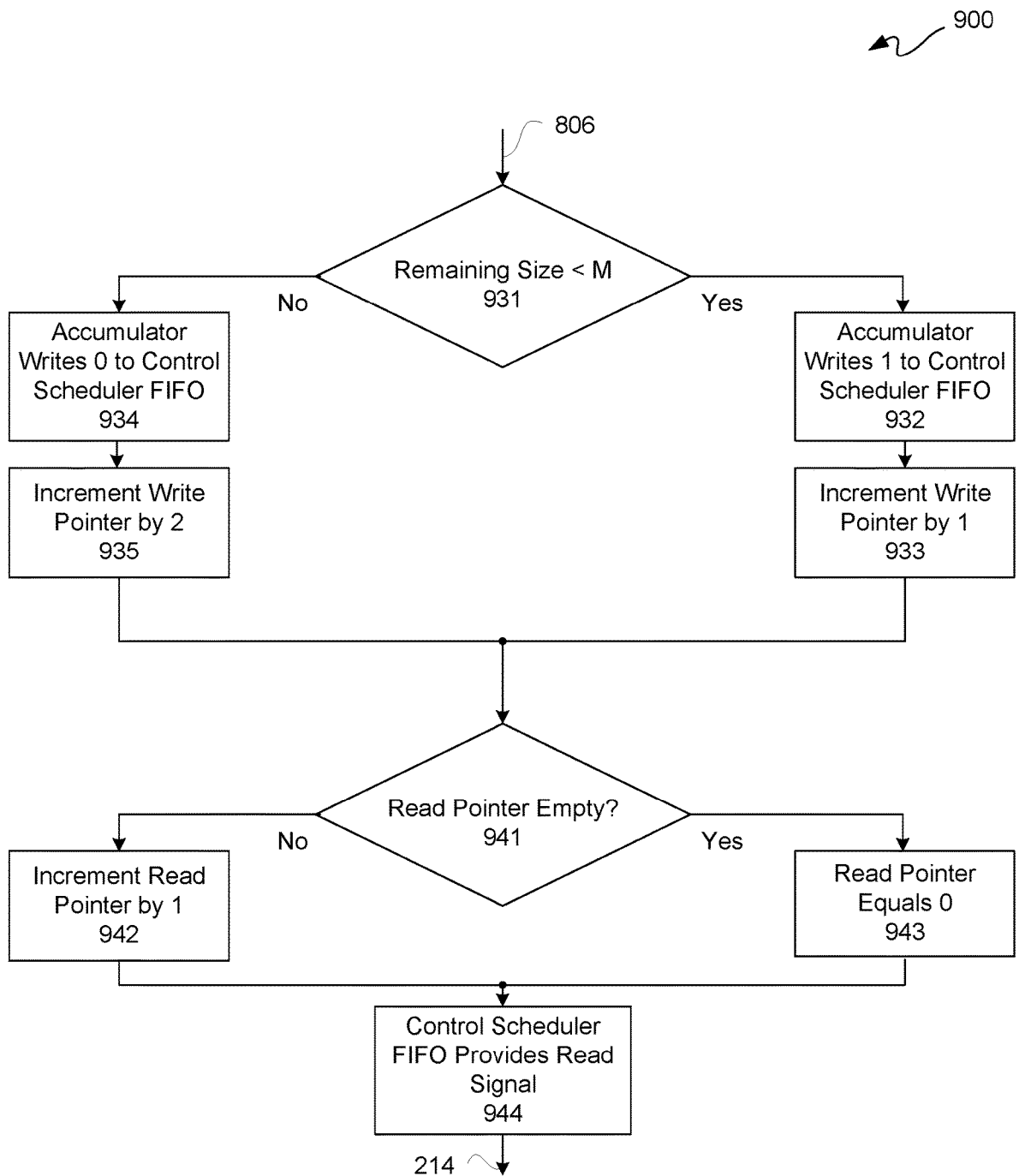
Figures 2, 9:

FIG. 9-1 is a flow diagram depicting an example of an expanded FIFO read scheduler flow 900 for expanded FIFO read scheduler 205 of FIG. 8. FIG. 9-2 is a table diagram depicting an example of a state table 950 for expanded FIFO read scheduler flow 900 of FIG. 9-2. With simultaneous reference to FIG. 1-1 through 9-2, expanded FIFO read scheduler flow 900 is further described.

In operation, a remaining size 806 may be received and compared at 931 to M. If a remaining size 806 is less than M as determined at 931, then at 932 an accumulator 810 writes a 1 to control scheduler FIFO 803 at 932. At 933, a write pointer, such as for memory 102, is incremented by 1. If, however, a remaining size 806 is equal to or greater than M as determined at 931, then at 934 an accumulator 810 writes a 0 to control scheduler FIFO 803. At 935, a write pointer, such as for memory 102, is incremented by 2. Increment by 2 is for when a packet spans more than one clock cycle due to gap insertion; however, mapping is still one location to one clock cycle.

At 941, it is determined whether a read pointer of control scheduler FIFO 803 is empty. If at 941 it is determined that a read pointer is empty, then at 943 such read pointer is set to equal 0. Such read pointer may be used for read signal 214. However, for every clock cycle of clock signal 119 that a read pointer of control scheduler FIFO 803 is not empty, such read pointer is incremented by 1 at 942.

At 944, after either operation at 942 or 943, control scheduler FIFO 803 provides a read signal 214. Table 950 indicates states 955 of read signal 214 responsive to a combination of control scheduler FIFO 803 state 951, empty or not, a current location state 952 pointed to by a read pointer stores a 0 or 1, and/or a previous output state 953 of 0 or 1 of such read pointer. Additionally, some states are don't cares or Xs.

In another example, per channel depth, d, of control scheduler FIFO 803 may be the same as expanded index FIFO 206. When extra control words, including maximum extra control words, inserted into a data path is equal to or greater than datapath width in one clock cycle, then width of control scheduler FIFO 803 is $\text{ceil}(\log_2(1+Q))$ for maximum extra words having a size Q, which for the above example is 64-bit words. This calculation is similar to Equation (1a) above; however, instead of stopping reading for one clock cycle for a remainder of M or greater, stopping may be performed for N clock cycles for N greater than 1.

As described above, insertion of gaps between Ethernet frames or packets in a network application is used in a network application on a transmission side. On a receive side, indexes in switch control signal 116 may be used by switch 105 to identify position of control words in FIFOs 103 and only select data words by switch 105. In such a reverse operation, for control words present in an output row of FIFOs 103, one or more next rows may be used to fill an output of M data words. Indexes in switch control signal 116 may be used to identify position of control words in FIFOs 103 to ignore or skip over such control words for output of data words only by switch 105.

Generally, network data, such as Ethernet data, is separated from OOB control words by using indexes to reduce memory usage and/or increase scalability for a channelized system. Furthermore, effectively there are two scheduling processes being performed. A first scheduling process is for reading data words from FIFOs 103 responsive to read signal 114. A second scheduling process is for reading indexes from an expanded index FIFO 206 responsive to read signal 214. This second scheduling process is reflected in control signal 116 in addition to read signal 114. As described above, scheduling of indexes is less memory intensive than conventional use of words. For an FPGA implementation, at least 70 percent fewer lookup table memories ("LUTs") and at least 50 percent fewer registers may be used with only one-for-one increase in block RAM for M equal to 16 or higher, namely block RAM used may be 24 for M equal to 24. Furthermore, having smaller bit widths by use of indexes further increases ability to scale for a channelized system to support more channels. Additionally, a feed forward configuration as described herein may be clocked at a higher maximum frequency. Along those lines, by scheduling indexes through asserting a read signal 114 with a control signal 116, conventional FIFO data output to FIFO data reading dependency is avoided. Effectively, a conventional feedback path for controlling data reads is converted into a feed forward path. A feed forward path is more readily configurable for pipelining or pipelined operation, which facilitates higher throughput and/or less congestion.

Because one or more of the examples described herein may be implemented in an FPGA, a detailed description of such an IC is provided. However, it should be understood that other types of ICs may benefit from the technology described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Figure 10:
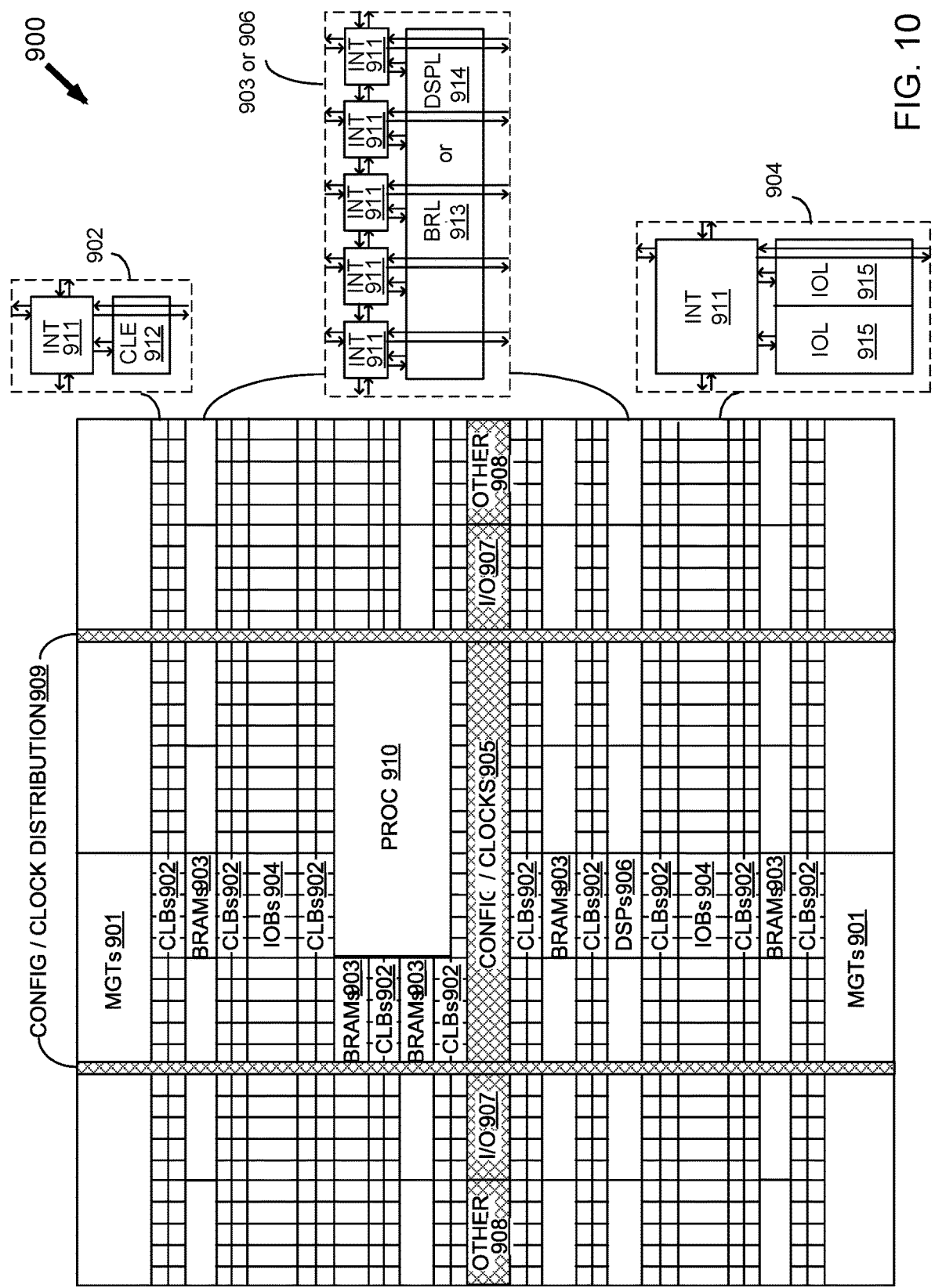
FIG. 10 is a simplified block diagram depicting an exemplary columnar Field Programmable Gate Array ("FPGA") architecture.

As noted above, advanced FPGAs can include several different types of programmable logic blocks in the array. For example, FIG. 10 illustrates an FPGA architecture 900 that includes a large number of different programmable tiles including multi-gigabit transceivers ("MGTs") 901, configurable logic blocks ("CLBs") 902, random access memory blocks ("BRAMs") 903, input/output blocks ("IOBs") 904, configuration and clocking logic ("CONFIG/CLOCKS") 905, digital signal processing blocks ("DSPs") 906, specialized input/output blocks ("I/O") 907 (e.g., configuration ports and clock ports), and other programmable logic 908 such as digital clock managers, analog-to-digital converters, system monitoring logic, and so forth. Some FPGAs also include dedicated processor blocks ("PROC") 910.

In some FPGAs, each programmable tile includes a programmable interconnect element ("INT") 911 having standardized connections to and from a corresponding interconnect element in each adjacent tile. Therefore, the programmable interconnect elements taken together implement the programmable interconnect structure for the illustrated FPGA. The programmable interconnect element 911 also includes the connections to and from the programmable logic element within the same tile, as shown by the examples included at the top of FIG. 10.

For example, a CLB 902 can include a configurable logic element ("CLE") 912 that can be programmed to implement user logic plus a single programmable interconnect element ("INT") 911. A BRAM 903 can include a BRAM logic element ("BRL") 913 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 906 can include a DSP logic element ("DSPL") 914 in addition to an appropriate number of programmable interconnect elements. An IOB 904 can include, for example, two instances of an input/output logic element ("IOL") 915 in addition to one instance of the programmable interconnect element 911. As will be clear to those of skill in the art, the actual I/O pads connected, for example, to the I/O logic element 915 typically are not confined to the area of the input/output logic element 915.

In the pictured embodiment, a horizontal area near the center of the die (shown in FIG. 10) is used for configuration, clock, and other control logic. Vertical columns 909 extending from this horizontal area or column are used to distribute the clocks and configuration signals across the breadth of the FPGA.

Some FPGAs utilizing the architecture illustrated in FIG. 10 include additional logic blocks that disrupt the regular columnar structure making up a large part of the FPGA. The additional logic blocks can be programmable blocks and/or dedicated logic. For example, processor block 910 spans several columns of CLBs and BRAMs.

Note that FIG. 10 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 10 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. An apparatus for a channelized communication system, comprising:
   a controller configured to generate a read signal and a switch control signal;
   channelized buffers configured to receive data words from multiple channels associated with groups of information and the read signal for reading out the data words from the channelized buffers; and
   a switch configured to receive the data words from the channelized buffers responsive to the read signal,
   the switch configured to insert a gap between the groups of information and to selectively insert one or more control words in the gap responsive to the switch control signal,
   the switch control signal having indexes for selection of the data words and the control words,
   the controller configured to receive out-of-band signals, the controller comprising:
      a gap calculation circuit configured to provide a number of the control words to be inserted in the gap between the groups of information based on information of the out-of-band signals, wherein the controller is further configured to expand the indexes of the switch control signal based on the number of control words.

2. The apparatus according to claim 1, wherein the control words comprise one or more of idle words, header words, tail words, or don't care words.

3. The apparatus according to claim 1, wherein the switch includes:
   a data selection portion for selection of the data words; and
   a control selection portion for selection of the control words.

4. The apparatus according to claim 1, wherein the read signal is a first read signal, and wherein the controller comprises:
   an expanded size calculation circuit configured to receive the number and add the number to an integer number M of parallel first-in, first-out buffers for the channelized buffers to obtain an expanded size;
   a backpressure calculation circuit configured to receive the expanded size and to generate a backpressure signal;
   an expanded index converter configured to receive the expanded size and to output a sequence of input indexes;
   an expanded buffer read scheduler configured to receive the expanded size and to generate a second read signal;
   an expanded index buffer configured to receive the sequence of input indexes and the second read signal to output a sequence of output indexes; and
   a shift and merge circuit configured to receive the sequence of output indexes and to shift and merge the sequence of output indexes with a remainder to provide the switch control signal and the first read signal.

5. The apparatus according to claim 4, wherein the backpressure calculation circuit comprises an accumulator configured to increment and decrement the expanded size for generation of the backpressure signal.

6. The apparatus according to claim 4, wherein the expanded buffer read scheduler comprises:
   a context memory to store a previous value of the expanded size;
   an accumulator to receive the expanded size and the previous value thereof for addition to provide a current value of the expanded size as a read pointer; and
   a first-in, first-out buffer configured to assert or not assert the second read signal responsive to the read pointer.

7. The apparatus according to claim 6, wherein the first-in, first-out buffer comprise N first-in, first-out buffers each with a depth d and each 1-bit wide for an integer number N of the multiple channels with correspondence to channel identifiers.

8. The apparatus according to claim 7, wherein the integer number N is greater than the integer number M.

9. The apparatus according to claim 8, where the integer number M is a maximum number of the data words input to the channelized buffers on a clock cycle and is a maximum number of the data words or the control words or a combination thereof output on the clock cycle.

10. The apparatus according to claim 4, wherein the groups of information are packets or frames.

11. A method for a channelized communication system, comprising:
    generating a read signal and a switch control signal by a controller;
    receiving data words from multiple channels associated with groups of information and the read signal by channelized buffers;
    reading out the data words from the channelized buffers responsive to the read signal;
    receiving the data words from the channelized buffers responsive to the read signal by a switch;
    inserting a gap between the groups of information by the switch;
    selectively inserting one or more control words in the gap by the switch responsive to the switch control signal, the switch control signal having indexes for selection of the data words and the one or more control words;
    determining, by the controller, a number of the one or more control words to be inserted in the gap between the groups of information based on information of out-of-band signals received by the controller; and
    expanding the indexes of the switch control signal based on the number of control words.

12. The method according to claim 11, wherein the control words comprise one or more of idle words, header words, tail words, or don't care words.

13. The method according to claim 11, wherein the switch further selects the data words from a data selection portion and selects the control words from a control selection portion.

14. The method according to claim 11, wherein the read signal is a first read signal, and wherein the controller:
    adds the sum by an expanded size calculation circuit to an integer number M of parallel first-in, first-out buffers for the channelized buffers to obtain an expanded size;
    generates a backpressure signal responsive to the expanded size by a backpressure calculation circuit;
    generates a sequence of input indexes by an expanded index converter responsive to the expanded size;
    generates a second read signal by an expanded buffer read scheduler responsive to the expanded size;
    generates a sequence of output indexes by an expanded index buffer responsive to the sequence of input indexes and the second read signal; and
    shifts and merges the sequence of output indexes with a remainder by a shift and merge circuit to provide the switch control signal and the first read signal.

15. The method according to claim 14, wherein the backpressure calculation circuit has an accumulator to increment and decrement the expanded size for generation of the backpressure signal.

16. The method according to claim 14, wherein the expanded buffer read scheduler:
- stores in a context memory a previous value of the expanded size;
- adds with an accumulator the expanded size and the previous value thereof to provide a current value of the expanded size as a read pointer; and
- asserts or de-asserts the second read signal from a first-in, first-out buffer responsive to the read pointer provided thereto.

17. The method according to claim 16, wherein the first-in, first-out buffer comprise N first-in, first-out buffers each with a depth d and each 1-bit wide for an integer number N of the multiple channels with correspondence to channel identifiers.

18. The method according to claim 17, wherein the integer number N is greater than the integer number M.

19. The method according to claim 18, where the integer number M is a maximum number of the data words input to the channelized buffers on a clock cycle and is a maximum number of the data words or the control words or a combination thereof output on the clock cycle.

20. The method according to claim 14, wherein the groups of information are packets or frames.

* * * * *